(12) United States Patent
Isobe

(10) Patent No.: US 10,286,507 B2
(45) Date of Patent: May 14, 2019

(54) MACHINE TOOL HAVING FUNCTION OF DIAGNOSING ABNORMALITY OF SPEED REDUCER OF TOOL CHANGER

(71) Applicant: FANUC Corporation, Yamanashi (JP)

(72) Inventor: Gaku Isobe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 302 days.

(21) Appl. No.: 15/406,354

(22) Filed: Jan. 13, 2017

(65) Prior Publication Data
US 2017/0203400 A1   Jul. 20, 2017

(30) Foreign Application Priority Data
Jan. 20, 2016   (JP) .................................. 2016-008482

(51) Int. Cl.
*B23Q 3/155* (2006.01)
*B23Q 3/157* (2006.01)
*B23Q 17/00* (2006.01)

(52) U.S. Cl.
CPC ..... *B23Q 3/15706* (2013.01); *B23Q 3/15722* (2016.11); *B23Q 17/007* (2013.01); *B23Q 3/15526* (2013.01); *B23Q 3/15534* (2016.11); *B23Q 3/15713* (2013.01)

(58) Field of Classification Search
CPC ............ B23Q 3/15534; B23Q 3/15526; B23Q 3/15706; B23Q 3/15713
See application file for complete search history.

(56) References Cited

U.S. PATENT DOCUMENTS

| | | | | |
|---|---|---|---|---|
| 3,798,721 A | * | 3/1974 | Schalles | B23B 29/24 29/42 |
| 4,054,975 A | * | 10/1977 | Lundstrom | B23B 3/161 29/27 C |
| 4,297,925 A | * | 11/1981 | Ishizuka | B23B 3/161 408/35 |

(Continued)

FOREIGN PATENT DOCUMENTS

| | | |
|---|---|---|
| DE | 102008008788 B3 | 5/2009 |
| DE | 102014114420 A1 | 4/2015 |

(Continued)

OTHER PUBLICATIONS

Decision to Grant a Patent in JP Patent Application No. 2016-008482, dated Dec. 5, 2017, 6 pp.

(Continued)

*Primary Examiner* — Ronald D Hartman, Jr.
(74) *Attorney, Agent, or Firm* — Hauptman Ham, LLP

(57) ABSTRACT

Tool mass arrangement patterns of masses of tools loaded onto tool holding parts of a tool magazine and thresholds, which are associated with the patterns and used to diagnose the abnormality of a speed reducer, are stored after associating the patterns with the thresholds. In addition, the masses of the tools loaded onto the respective tool holding parts are stored. Further, a tool mass arrangement pattern similar to a stored tool mass arrangement, among the stored tool mass arrangement patterns, is selected, and a threshold associated with the selected tool mass arrangement pattern is set as a threshold to be used to diagnose the abnormality of the speed reducer.

6 Claims, 5 Drawing Sheets

(56) References Cited

U.S. PATENT DOCUMENTS

| | | | | |
|---|---|---|---|---|
| 4,355,446 | A | * | 10/1982 | Shimajiri .............. B23B 39/205 29/26 A |
| 4,581,810 | A | | 4/1986 | Kawakami et al. |
| 4,827,600 | A | * | 5/1989 | Miyano .............. B23Q 3/15706 29/26 A |
| 5,300,006 | A | * | 4/1994 | Tanaka ................ B23Q 3/15706 483/56 |
| 5,499,963 | A | * | 3/1996 | Fujimoto ........... B23Q 3/15706 483/54 |
| 5,702,336 | A | * | 12/1997 | Kameyama .......... B23Q 3/1554 294/106 |
| 2007/0225139 | A1 | * | 9/2007 | Kojima .............. B23Q 3/15706 483/1 |
| 2008/0215292 | A1 | | 9/2008 | Kato et al. |
| 2015/0104263 | A1 | | 4/2015 | Isobe |
| 2015/0352679 | A1 | | 12/2015 | Yamamoto et al. |
| 2017/0203400 | A1 | * | 7/2017 | Isobe ................ B23Q 3/15722 |

FOREIGN PATENT DOCUMENTS

| | | |
|---|---|---|
| JP | H4-354656 A | 12/1992 |
| JP | H0552712 | 3/1993 |
| JP | H10-315087 A | 12/1998 |
| JP | H11-333657 A | 12/1999 |
| JP | 2001-62672 A | 3/2001 |
| JP | 2005-224896 A | 8/2005 |
| JP | 3780508 B2 | 5/2006 |
| JP | 2008032477 A | 2/2008 |
| JP | 2009-34794 A | 2/2009 |
| JP | 2014-172107 A | 9/2014 |

OTHER PUBLICATIONS

Office Action in Chinese Application No. 201710049740.8, dated Jul. 2, 2018, 12 pp.

Office Action in DE Application No. 102017100679.6, dated Oct. 31, 2018, 5pp.

* cited by examiner

FIG. 1A
FIG. 1B
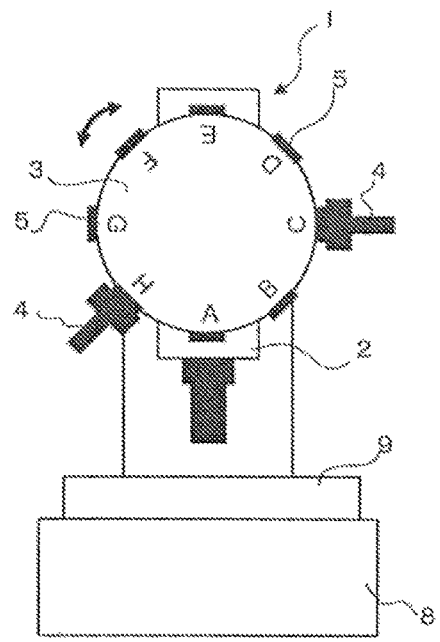
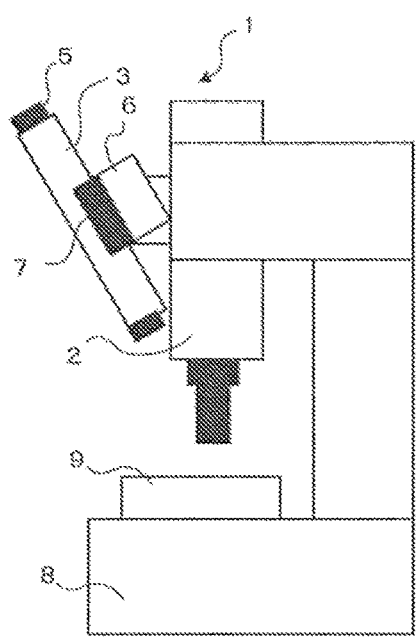
FIG. 2
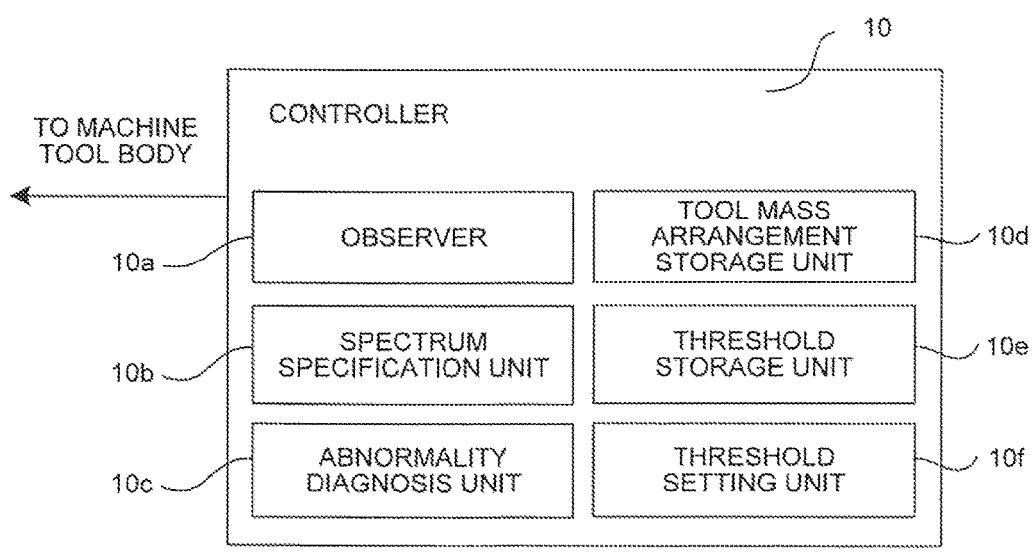

TOOL MASS ARRANGEMENT DATA

| TOOL HOLDING PART | TOOL MASS [kg] |
|---|---|
| A | 3 |
| B | 0 |
| C | 1 |
| D | 1.5 |
| E | 1 |
| F | 0.5 |
| G | 1 |
| H | 1 |

PATTERN P1; THRESHOLD X1

| TOOL HOLDING PART | TOOL MASS [kg] |
|---|---|
| A | 1 |
| B | 1 |
| C | 1 |
| D | 1 |
| E | 2 |
| F | 2 |
| G | 2 |
| H | 2 |

PATTERN P2; THRESHOLD X2

| TOOL HOLDING PART | TOOL MASS [kg] |
|---|---|
| A | 3 |
| B | 0 |
| C | 1 |
| D | 1 |
| E | 1 |
| F | 1 |
| G | 1 |
| H | 1 |

PATTERN P3; THRESHOLD X3

| TOOL HOLDING PART | TOOL MASS [kg] |
|---|---|
| A | 0 |
| B | 0 |
| C | 1 |
| D | 1 |
| E | 1 |
| F | 1 |
| G | 0 |
| H | 0 |

MACHINE TOOL HAVING FUNCTION OF DIAGNOSING ABNORMALITY OF SPEED REDUCER OF TOOL CHANGER

RELATED APPLICATIONS

The present application claims priority to Japanese Patent Application Number 2016-008482, filed Jan. 20, 2016, the discloser of which is hereby incorporated by reference herein in its entirety.

BACKGROUND OF THE INVENTION

1. Field of the Invention

The present invention relates to a machine tool capable of diagnosing the abnormality of a speed reducer used in a tool changer thereof having a tool magazine.

2. Description of the Related Art

As a method for diagnosing the abnormality of a speed reducer, there has been known a method in which a sensor is installed at a diagnosis target part and the abnormality of the speed reducer is diagnosed based on information from the sensor. According to this method, detection of an abnormality is made after the abnormality occurred, so abnormality prediction is not possible. Further, as a method for predicting abnormality, there has been known a method in which a vibration pattern is detected by a vibration sensor and the vibration pattern is compared with a normal vibration pattern to predict the abnormality in advance (see Japanese Patent Application Laid-open No. H5-52712). However, since noise is contained in a signal from the sensor, the method cannot clearly distinguish between normality and abnormality.

Furthermore, as a method and an apparatus for predicting the abnormality of a speed reducer, there have been known a speed reducer abnormality diagnosis method and a diagnosis apparatus in which disturbance torque is estimated by an observer based on the torque command and the speed feedback of a motor, time-series data on the estimated disturbance torque is subjected to frequency analysis in order to extract a specific spectrum corresponding to a constant multiple of the rotational frequency of the intermediate element of the speed reducer, and abnormality is determined when the amplitude of the specific spectrum exceeds a threshold (see Japanese Patent Application Laid-open No. 2008-32477). In the method, with no noise being contained in data, the abnormality of the speed reducer can be accurately diagnosed.

With the above speed reducer abnormality diagnosis method in which disturbance torque is estimated by the observer and the abnormality of the speed reducer is detected based on the estimated disturbance torque, it is possible to accurately predict the abnormality of the speed reducer. However, in a case in which the method is applied to a speed reducer used to rotate a tool magazine in the tool changer of a machine tool, inertia on the output side of the speed reducer changes, which results in a change in disturbance torque when tools are replaced. Therefore, the method has a problem with accurately diagnosing the speed reducer when the tools are replaced.

SUMMARY OF THE INVENTION

In view of the above problems, the present invention has an object of allowing a machine tool having a tool changer including a rotating-type tool magazine to accurately diagnose the abnormality of a speed reducer based on estimation disturbance torque calculated by an observer.

A machine tool according to the present invention includes: a rotating-type tool magazine that is capable of attaching/detaching a tool to/from a spindle of the machine tool; a plurality of tool holding parts that are radially provided at the tool magazine; a magazine driving motor that causes the tool magazine to rotate; a speed reducer that decelerates rotation of the magazine driving motor and transmits the decelerated rotation to the tool magazine; and a controller that has a function of estimating a disturbance estimation value on the speed reducer by an observer, based on a torque command and a speed feedback acquired when the magazine driving motor is rotated at a constant speed, and extracting a specific spectrum from a frequency component of the disturbance estimation value acquired by frequency analysis, and moreover comparing an amplitude of the specific spectrum with a threshold, thereby diagnosing abnormality of the speed reducer.

According to a first embodiment of the machine tool of the present invention, the controller includes: a tool mass arrangement storage unit that stores masses of tools loaded onto the respective tool holding parts; a threshold storage unit that stores tool mass arrangement patterns in the tool magazine and thresholds used to diagnose the abnormality of the speed reducer after associating the patterns with the thresholds; and a threshold setting unit that selects a tool mass arrangement pattern similar to a tool mass arrangement stored in the tool mass arrangement storage unit among the tool mass arrangement patterns stored in the threshold storage unit and sets a threshold associated with the tool mass arrangement pattern as a threshold to be used to diagnose the abnormality of the speed reducer.

According to the machine tool, it is possible to accurately diagnose the abnormality of the speed reducer even when the tools of the tool magazine are replaced.

The threshold setting unit may calculate absolute values of differences of the tool masses, between the respective tool holding parts, of a tool mass arrangement pattern stored in the tool mass arrangement storage unit and the tool mass arrangement patterns stored in the threshold storage unit, and select a tool mass arrangement pattern with which a sum total of the absolute values becomes smallest, thereby setting a threshold.

According to a second embodiment of the machine tool of the present invention, the controller includes: a threshold storage unit that changes tool mass arrangement patterns of the tool magazine to calculate load waveforms of the magazine driving motor acquired when the tool magazine is rotated at a prescribed speed pattern and stores the acquired load waveforms and thresholds associated with the load waveforms; a load waveform acquisition unit that rotates the tool magazine at the prescribed speed pattern to calculate a load waveform of the magazine driving motor; and a threshold setting unit that compares the load waveform acquired by the load waveform acquisition unit with the respective load waveforms stored in the threshold storage unit and sets a threshold, which is associated with a load waveform having a largest correlation coefficient and stored in the threshold storage unit, as a threshold to be used to diagnose abnormality of the speed reducer.

According to the machine tool, it is possible to accurately diagnose the abnormality of the speed reducer even when the tools of the tool magazine are replaced.

According to a third embodiment of the machine tool of the present invention, the controller includes: a tool mass arrangement storage unit that stores masses of tools loaded onto the respective tool holding parts; a reference tool mass arrangement storage unit that stores a reference tool mass arrangement pattern, based on which the masses of the tools loaded onto the respective tool holding parts are arranged; a threshold storage unit that stores thresholds for respective deviation patterns between some tool mass arrangement patterns and the reference tool mass arrangement pattern; a deviation pattern acquisition unit that calculates a deviation pattern between a tool mass arrangement stored in the tool mass arrangement storage unit and the reference tool mass arrangement pattern; and a threshold setting unit that selects a deviation pattern similar to the deviation pattern acquired by the deviation pattern acquisition unit among the deviation patterns stored in the threshold storage unit and sets a threshold associated with the deviation pattern as a threshold to be used to diagnose abnormality of the speed reducer.

According to the machine tool, it is possible to accurately diagnose the abnormality of the speed reducer even when the tools of the tool magazine are replaced.

According to a fourth embodiment of the machine tool of the present invention, the controller includes: a magazine total mass/centroid position storage unit that stores a total mass and a centroid position of the tool magazine; a threshold storage unit that stores some total mass/centroid position patterns of the tool magazine and thresholds after associating the patterns with the thresholds; and a threshold setting unit that selects a pattern similar to a total mass/centroid position pattern stored in the magazine total mass/centroid position storage unit among the total mass/centroid position patterns stored in the threshold storage unit and sets a threshold associated with the pattern as a threshold to be used to diagnose abnormality of the speed reducer.

According to the machine tool, it is possible to accurately diagnose the abnormality of the speed reducer even when the tools of the tool magazine are replaced.

In the machine tool of each of the embodiments, the controller may be configured to inform, when the specific spectrum exceeds the threshold at diagnosis of the abnormality of the speed reducer, a fact that the specific spectrum exceeds the threshold, via a display device.

An embodiment of the present invention is configured to set, even when the tools of the tool magazine are replaced, a threshold used to diagnose the abnormality of the speed reducer so as to suit the tool magazine on which the tools are replaced. Therefore, it is possible to accurately diagnose the abnormality of the speed reducer.

BRIEF DESCRIPTION OF THE DRAWINGS

FIGS. 1A and 1B are outline views of a machine tool including a tool changer having a rotating-type tool magazine in an embodiment of the present invention;

FIG. 2 is an outline diagram of a controller that controls a machine tool in the embodiment;

DETAILED DESCRIPTION OF THE PREFERRED EMBODIMENTS

Figure 3:
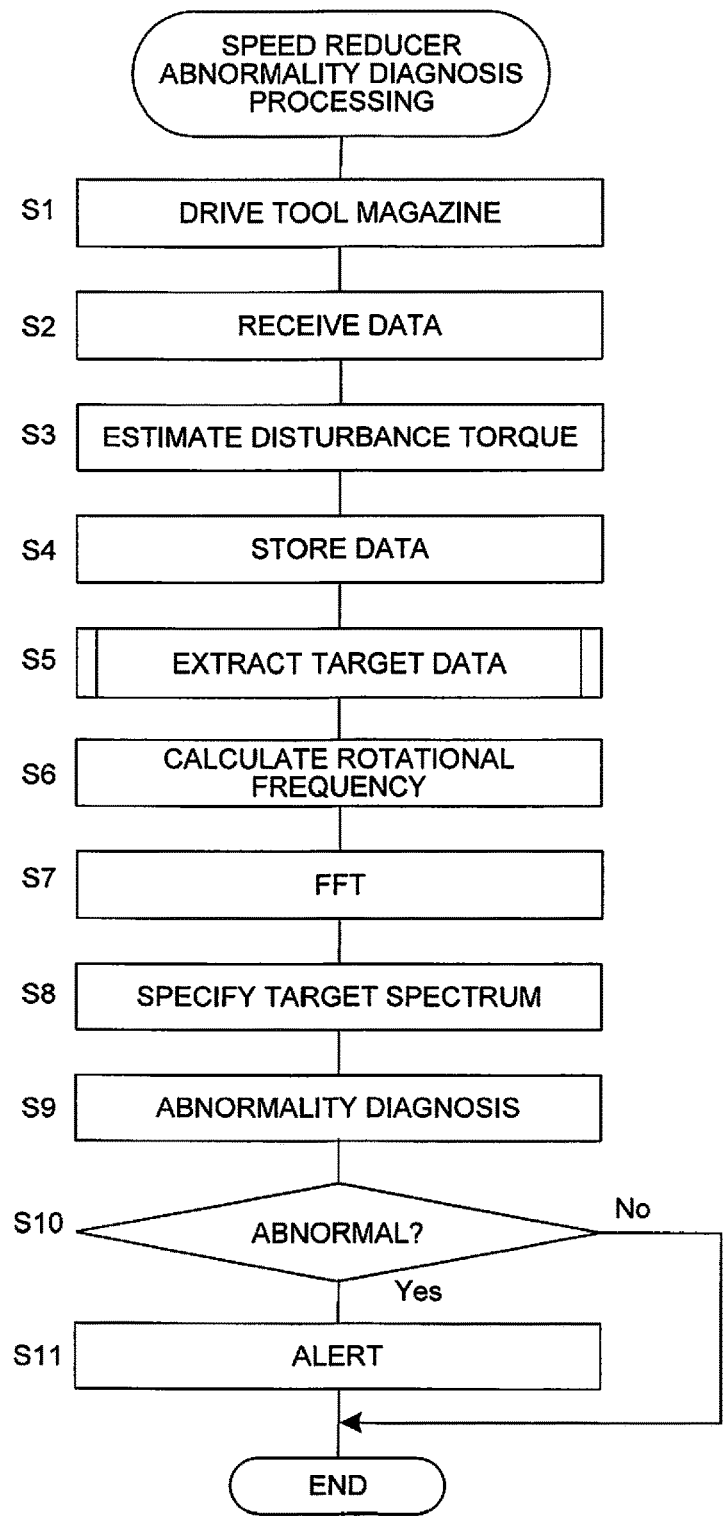
FIG. 3 is a flowchart showing the algorithm of speed reducer abnormality diagnosis processing in the embodiment.

FIGS. 1A and 1B are outline views of an example of a machine tool including a rotating-type tool magazine according to an embodiment of the present invention, FIG. 1A being a front view, FIG. 1B being a side view.

In FIGS. 1A and 1B, reference numeral 1 denotes the machine tool, reference numeral 2 denotes the spindle of the machine tool 1, and reference numeral 3 denotes the tool magazine. The tool magazine 3 includes tool holding parts 5 that radially hold tools 4, and is rotated and driven by a magazine driving motor 6 and a speed reducer 7. Note that reference numerals 8 and 9 denote the bed and the table of the machine tool, respectively.

At the replacement of the tools, a tool 4 loaded onto the spindle 2 is first transferred to one of the tool holding parts 5 of the tool magazine 3. Next, the tool magazine 3 is rotated to determine one of the tool holding parts 5 holding a tool 4 to be used at a spindle position. Then, the tool 4 to be used is transferred from the tool holding part 5 to the spindle 2.

When abnormality occurs in the speed reducer 7 in such a machine tool, the tool magazine 3 is not allowed to perform its normal rotating operation, whereby a tool or a workpiece may be damaged as the tool drops. Therefore, the present invention provides a speed reducer abnormality diagnosis function in the machine tool such that the machine tool is capable of predicting abnormality in advance and preventing the above trouble.

FIG. 2 is an outline diagram of a controller 10 of the machine tool 1 of the embodiment.

The controller 10 is constituted by a numerical controller and the like similarly to the controller of a conventional machine tool. The controller 10 is also the same in configuration as the conventional controller and includes a processor, a ROM, a RAM, a non-volatile memory, a digital servo circuit constituted by various interfaces, a display device, an input unit for inputting a command or data, or the like (not shown). The various memories, the various interfaces, and the digital servo circuit are connected to the processor via a system bus. The digital servo circuit performs the position loop control and the speed loop control of a servo motor based on feedback data, and performs the current loop control of the servo motor based on a current feedback signal from a servo amplifier such as a transistor inverter. Particularly, in association with the present invention, the controller 10 includes an observer 10a that estimates disturbance torque, a spectrum specification unit 10b, an abnormality diagnosis unit 10c, a tool mass arrangement storage unit 10d, a threshold storage unit 10e, and a threshold setting unit 10f.

The observer 10a is the same as a conventional one and estimates disturbance torque (disturbance estimation value) on the speed reducer based on a torque command and a speed feedback acquired when a pair of operating members, which is caused to relatively perform rotational movement by a motor, relatively rotates at a constant speed (constant cycle).

Further, the spectrum specification unit 10b extracts a specific target spectrum (specific spectrum), which corresponds to a constant multiple of the rotational frequency of a crank shaft when the pair of operating members relatively rotates at a constant speed, from a frequency component acquired by analyzing the frequency of time-series data on disturbance torque.

The abnormality diagnosis unit 10c diagnoses the abnormality of the speed reducer, and is the same as a unit disclosed in Japanese Patent Application Laid-open No. 2008-32477 that performs a known abnormality diagnosis method for a speed reducer.

The tool mass arrangement storage unit 10d stores the masses of the tools 4 loaded onto the respective tool holding parts 5 of the tool magazine 3, i.e., a tool mass arrangement.

The threshold storage unit 10e stores a plurality of patterns of tool mass arrangements and thresholds used to diagnose the abnormality of the speed reducer after associating the patterns with the thresholds.

The threshold setting unit 10f selects a tool arrangement pattern closest to a tool mass arrangement stored in the tool mass arrangement storage unit among tool mass arrangement patterns stored in the threshold storage unit, and sets a threshold associated with the tool arrangement pattern as a threshold used to diagnose the abnormality of the speed reducer.

The controller 10 performs speed reducer abnormality diagnosis processing at the replacement of the tools 4 of the tool magazine 3, at the start of the operation of the machine tool, automatically at prescribed time intervals, or at the reception of a speed reducer abnormality diagnosis command.

FIG. 3 is a flowchart showing the algorithm of a conventional speed reducer abnormality diagnosis method performed by the abnormality diagnosis unit 10c of the embodiment, and is the same as that disclosed in Japanese Patent Application Laid-open No. 2008-32477. Therefore, only its outline will be described below.

In step S1, the tool magazine 3 is driven and rotated for a prescribed time. In step S2, a speed feedback value and a torque command value are received for each prescribed sampling cycle $\Delta t$.

In step S3, the observer estimates disturbance torque, which contains a cycle component synchronizing with the rotation cycle of the intermediate shaft element (for example, a crank shaft that eccentrically rotates an outer tooth gear meshing with an inner tooth gear) of the speed reducer, from the received speed feedback value and the torque command value.

In step S4, the speed feedback value, the torque command value, and the estimated disturbance torque are stored as time-series data.

In step S5, target data in a case in which a speed feedback value v is larger than a threshold Lv and the tool magazine rotates at a constant speed is extracted.

Figure 4:
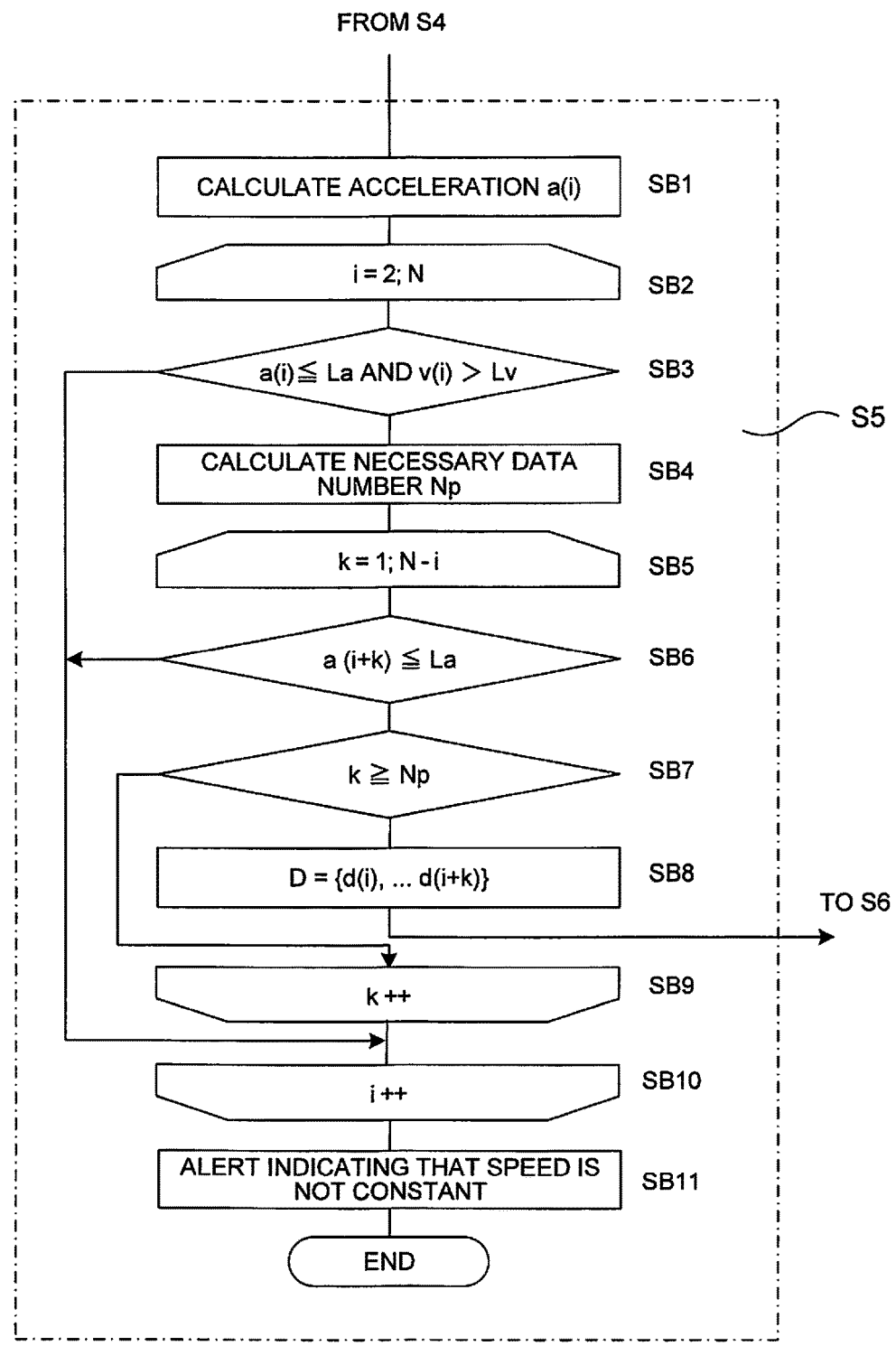
FIG. 4 is a flowchart showing the details of processing in step S5 in the flowchart of FIG. 3.

FIG. 4 shows a target data extraction routine in step S5 in detail.

First, acceleration a is calculated from the speed feedback value. A state in which the acceleration a continuously falls within a prescribed threshold La over a constant sampling period or more is regarded as a state in which the tool magazine 3 rotates at a constant speed, and time-series data D on disturbance torque d within the constant period is extracted (steps SB1 to SB8). Data number Np of the extracted disturbance torque d is set at at least a value, which is obtained by dividing a cycle Tp at which the intermediate shaft element of the speed reducer rotates one revolution by a sampling cycle $\Delta t$, or more. That is, the data number Np is set at Tp/$\Delta t$ or more. The cycle at which the intermediate shaft element rotates one revolution is calculated as the reciprocal of a rotational frequency Vp of the intermediate shaft element. Note that when the acceleration a does not continuously fall within the prescribed threshold La for the constant period or more, an alert is output to display a message that the speed is not constant on the display device or the like (step SB11).

When the time-series data D on the disturbance torque d is obtained in step S5 (step SB8), the processing proceeds to step S6 to multiply the first speed feedback value $v_0$ extracted within the constant period by a value, which is obtained by dividing n rotations of the intermediate shaft element by N rotations of a motor output shaft, i.e., a speed reducing ratio n/N to calculate the rotational frequency Vp of the intermediate shaft element of the speed reducer (Vp=$v_0$×(n/N)).

In step S7, frequency analysis (FFT) is performed.

In step S8, the amplitudes (F(1), F(2), F(3), ..., F(Np)) of target spectrums specified as cycle components corresponding to the integral multiples (Vp, 2×Vp, 3×Vp, ..., Np×Vp) of the rotational frequency Vp of the intermediate shaft element of the speed reducer are calculated.

On the other hand, a reference spectrum serving as a diagnosis reference is calculated in the same manner using values, which are obtained by adding a margin to spectrums ($F_{01}$, $F_{02}$, $F_{03}$, ..., $F_{0N}$) when the speed reducer normally operates, as the thresholds ($L_{f1}$, $L_{f2}$, $L_{f3}$, ..., $L_{fN}$).

In steps S9 and S10, the amplitudes of the diagnosis target spectrums are compared with the amplitude (threshold) of the reference spectrum. For example, when at least one of the amplitudes of the diagnosis target spectrums exceeds the amplitude of the reference spectrum, it is determined that abnormality occurs. As a result, in step S11, an alert is output. When no abnormality occurs, the processing ends without outputting the alert.

According to the above method, it is possible to predict the abnormality of the speed reducer based on a quantitative determination criterion.

However, when the above conventional speed reducer abnormality diagnosis processing is applied to the speed reducer of the tool changer of a machine tool, inertia on the output side of a speed reducer changes at the replacement of the tools of the magazine by a user. Therefore, disturbance torque exceeds a threshold, which causes a problem that the abnormality of the speed reducer is falsely detected.

In order to deal with the above problem, a threshold is changed according to a tool mass arrangement on tool magazine in the present invention, whereby it is possible to accurately diagnose the abnormality of the speed reducer even when the tools are replaced.

In addition, in the embodiment, the controller 10 includes the tool mass arrangement storage unit 10d that stores the masses of the tools 4 loaded onto the respective tool holding parts 5 of the tool magazine 3, i.e., a tool mass arrangement, and the threshold storage unit 10e that stores a plurality of patterns of tool mass arrangements and thresholds used to diagnose the abnormality of the speed reducer after associating the patterns with the thresholds.

Figure 6:
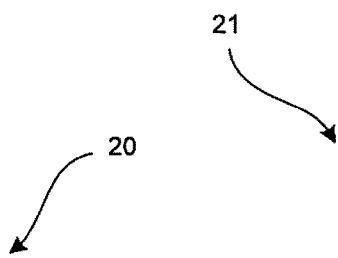
FIG. 6 is a diagram showing an example of tool mass arrangement position data and an example in which a plurality of patterns of tool mass arrangements and thresholds for the respective patterns are stored after associating the patterns with the thresholds.

FIG. 6 is a diagram showing an example of tool mass arrangement position data stored in the tool mass arrangement storage unit 10d and an example in which a plurality of patterns of tool mass arrangements and thresholds for the respective patterns are stored in the threshold storage unit 10e after associating the patterns with the thresholds.

In FIG. 6, reference numeral 20 denotes an example of tool mass arrangement position data stored in the tool mass arrangement storage unit 10d, and reference numeral 21 denotes an example in which a plurality of patterns of tool mass arrangements and thresholds for the respective patterns are stored in the threshold storage unit 10e after associating the patterns with the thresholds. FIG. 6 expresses the relationships between patterns P1 to P3 and thresholds X1 to X3 for the respective patterns.

Moreover, the controller 10 includes the threshold setting unit 10f, and causes the threshold setting unit 10f to select a tool arrangement pattern closest to a tool mass arrangement (for example, the tool mass arrangement denoted by reference numeral 20 in FIG. 6) stored in the tool mass arrangement storage unit 10d among tool arrangement patterns (for example, the patterns P1 to P3 in FIG. 6) in the threshold storage unit 10e and set a threshold associated with the selected tool arrangement pattern as a threshold used to diagnose the abnormality of the speed reducer.

Figure 5:
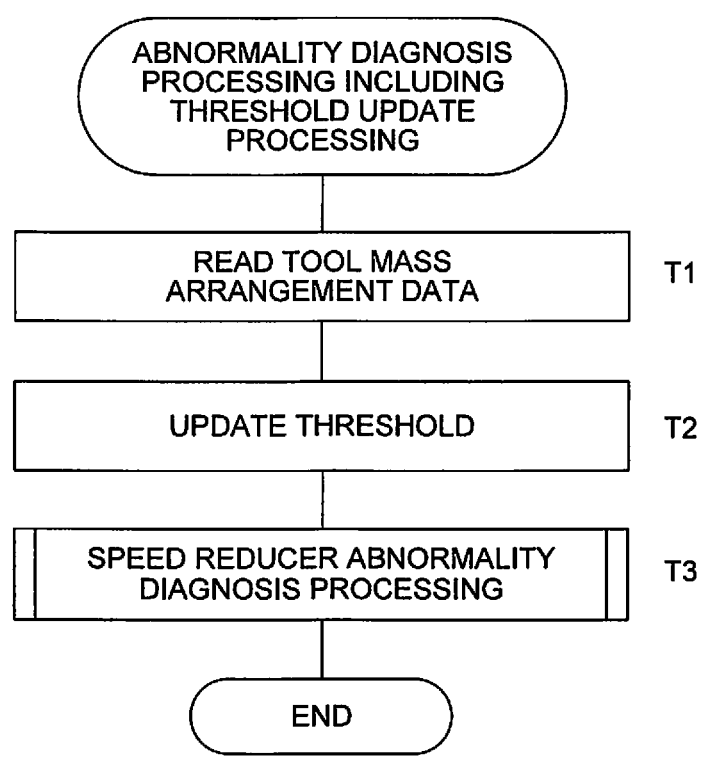
FIG. 5 is a flowchart showing the algorithm of the speed reducer abnormality diagnosis processing including threshold update processing in the embodiment.

FIG. 5 is a flowchart showing the algorithm of speed reducer abnormality diagnosis processing performed in the embodiment of the present invention including threshold update processing by the threshold setting unit 10f. The speed reducer abnormality diagnosis processing includes processing in steps T1 and T2 besides the conventional speed reducer abnormality diagnosis processing (processing in step T3) shown in FIGS. 3 and 4.

The controller 10 performs the speed reducer abnormality diagnosis processing shown in FIG. 5 at the replacement of the tools 4 for the tool magazine 3, at the start of the operation of the machine tool, or automatically at prescribed time intervals. In addition, the controller 10 performs the speed reducer abnormality diagnosis processing when receiving a speed reducer abnormality diagnosis command.

In step T1, the controller 10 reads tool mass arrangement data (for example, the tool mass arrangement data denoted by reference numeral 20 in FIG. 6) stored in the tool mass arrangement storage unit 10d. Note that in the replacement of the tools 4 for the tool magazine 3, the controller 10 receives new tool mass arrangement data to update the tool mass arrangement data stored in the tool mass arrangement storage unit 10d.

In step T2, the controller 10 compares the read tool mass arrangement data with a plurality of tool arrangement patterns (for example, the tool arrangement patterns denoted by reference numeral 21 in FIG. 6) stored in the threshold storage unit 10e and selects a similar tool arrangement pattern. Then, the controller 10 sets a threshold associated with the selected tool arrangement pattern as a threshold used to diagnose the abnormality of the speed reducer. That is, the controller 10 changes a threshold (the amplitude of a reference spectrum), which is to be compared with the amplitudes of diagnosis target spectrums in step S9 of the speed reducer abnormality diagnosis processing shown in FIG. 3, to this new threshold.

In step T3, the controller 10 performs the same speed reducer abnormality diagnosis processing as that of the conventional method shown in FIGS. 3 and 4.

A threshold is changed based on tool mass arrangement data stored in the controller. Therefore, it is possible to accurately diagnose the abnormality of the speed reducer even when the tools of the tool magazine are replaced on the condition that the tool mass arrangement data is properly updated.

When it is determined that abnormality has occurred in the speed reducer, an alert or the like on the abnormality is displayed to allow a user to be informed of the abnormality of the speed reducer.

Note that as a method for selecting a tool arrangement pattern similar to a read tool mass arrangement and updating a threshold in step T2, the controller calculates the absolute values of the differences of the tool masses, between the respective tool holding parts, of tool mass arrangement data and tool arrangement patterns, calculates the sum totals of the absolute values for all the tool arrangement patterns, and selects a tool arrangement pattern with which the calculated sum total becomes the smallest as a tool arrangement pattern similar to an actual tool arrangement to determine a threshold.

Besides, any method may be used to select a tool arrangement pattern similar to read tool mass arrangement data using a specific algorithm. For example, the load waveform of the motor obtained when the tool magazine 3 rotates at a prescribed speed pattern may be compared with the load waveforms of a plurality of tool arrangement patterns measured in advance to select a tool arrangement pattern having the largest correlation coefficient. Note that in this case, it may also be possible to store thresholds for the respective load waveforms of the motor in advance rather than storing the same in association with the tool arrangement patterns, rotate the magazine at the prescribed speed pattern to calculate the load waveform of the motor, and select and set a threshold stored for a load waveform having the largest correlation coefficient with respect to the load waveform. In this case, it is assumed that the processing in step T1 corresponds to the processing in which the tool magazine 3 is rotated at the prescribed speed pattern to obtain the load waveform of the motor.

Further, instead of selecting a pattern similar to an actual tool mass arrangement among a plurality of stored tool mass arrangement patterns and determining a threshold, it may also be possible to prepare and store a specific reference pattern in advance and determine a threshold based on a deviation from the reference pattern. In this case, instead of storing tool mass arrangement patterns and thresholds, it is only necessary to store a plurality of deviation patterns and thresholds associated with the respective deviation patterns in the storage unit as well as a reference tool mass arrangement pattern, calculate the deviation between an actual tool mass arrangement pattern and the reference tool mass arrangement pattern, select a deviation pattern similar to the deviation, and employ a threshold for the deviation pattern.

Further, as a method for storing a tool mass arrangement in the tool mass arrangement storage unit 10d, it may also be possible to automatically estimate and input the tool mass arrangement in the following manner rather than directly inputting the same by a user.

First, load torque T produced when the tool magazine 3 is rotated at constant acceleration $\alpha$ and load torque T' produced when the tool magazine 3 is stopped are measured in a certain phase of the tool magazine 3. Next, inertia I of the entire tool magazine is calculated as $I=(T-T')/\alpha$. When the inertia of the tool magazine onto which the tools are not loaded is $I_0$ (a known value) and it is assumed that the centroid of the tools is away from the center of the magazine by r, a total mass $m_{all}$ of the tools is calculated as $m_{all}=(I-I_0)/r^2$. In addition, the tool magazine 3 is further rotated at a constant speed to measure load torque in a plurality of phases, whereby the deviations of the tool masses between the right and left sides of the magazine in the phases are calculated.

Based on the calculated total mass $m_{all}$ of the tools and the deviations of the tool masses between the right and left sides of the magazine in the plurality of phases, a rough tool mass arrangement may be estimated and automatically stored in the tool mass arrangement storage unit 10d. In the manner described above, it is possible to store a tool mass arrangement without being directly input by a user.

Further, the above example describes a case in which a threshold used to diagnose the abnormality of the speed reducer is determined based on tool mass arrangement data, but the threshold may be determined based on data on the total mass and the centroid position of the tool magazine instead of tool mass arrangement data. The mass and the centroid position of the tool magazine onto which the tools are not loaded are known, and the masses and the centroid position of the loaded tools themselves are also known. Therefore, it is possible to calculate the total mass and the centroid position of the tool magazine after the tools are loaded onto the tool magazine.

Further, the total mass and the centroid position of the tool magazine when or after the tools are replaced are calculated and set, whereby it is possible to update a threshold from threshold data stored in association with the total mass and the centroid position of the tool magazine. In this case, a magazine total mass/centroid position storage unit that stores the total mass and the centroid position of the tool magazine is provided instead of the tool mass arrangement storage unit that stores the masses of the tools loaded onto the respective holding parts, and a threshold storage unit that stores total mass/centroid position patterns and thresholds after associating the patterns with the thresholds is provided instead of the threshold storage unit that stores tool mass arrangement patterns and thresholds after associating the patterns with the thresholds. Here, with the threshold setting unit, a threshold associated with a pattern similar to a total mass/centroid position pattern stored in the magazine total mass/centroid position storage unit, selected from among the total mass/centroid position patterns stored in the threshold storage unit, may be set as a threshold used to diagnose the abnormality of the speed reducer.

In this case as well, a threshold is determined based on the total mass and the centroid position of the tool magazine that change with the replacement of the tools. Therefore, it is possible to accurately diagnose the abnormality of the speed reducer even when the tools of the tool magazine are replaced.

In the embodiment, a threshold based on which the abnormality of the speed reducer is determined is changed to determine the abnormality of the speed reducer, and the threshold is determined based on tool mass arrangement data. Therefore, when the tool mass arrangement data is not properly updated, there is a likelihood that the speed reducer is determined to be abnormal even if the abnormality has not actually occurred in the speed reducer. In view of this problem, when an alert is output in step S11 of the speed reducer abnormality determination processing shown in FIG. 3, it is preferable to display a message urging a user to confirm an error in tool mass arrangement data on the display device.

In the manner described above, when any error occurs in a tool mass arrangement, the user is allowed to correct the error and diagnose the abnormality of the speed reducer again to perform accurate diagnosis.

The invention claimed is:

1. A machine tool comprising:
   a rotating-type tool magazine that is capable of attaching/detaching a tool to/from a spindle of the machine tool;
   a plurality of tool holding parts that are radially provided at the tool magazine;
   a magazine driving motor that causes the tool magazine to rotate;
   a speed reducer that decelerates rotation of the magazine driving motor and transmits the decelerated rotation to the tool magazine; and
   a controller that has a function of estimating a disturbance estimation value on the speed reducer by an observer, based on a torque command and a speed feedback acquired when the magazine driving motor is rotated at a constant speed, and extracting a specific spectrum from a frequency component of the disturbance estimation value acquired by frequency analysis, and moreover comparing an amplitude of the specific spectrum with a threshold, thereby diagnosing abnormality of the speed reducer, wherein
   the controller includes:
   a tool mass arrangement storage unit that stores masses of tools loaded onto the respective tool holding parts;
   a threshold storage unit that stores tool mass arrangement patterns in the tool magazine and thresholds used to diagnose the abnormality of the speed reducer after associating the patterns with the thresholds, and
   a threshold setting unit that selects a tool mass arrangement pattern similar to a tool mass arrangement stored in the tool mass arrangement storage unit among the tool mass arrangement patterns stored in the threshold storage unit, and sets a threshold associated with the tool mass arrangement pattern as a threshold to be used to diagnose the abnormality of the speed reducer.

2. The machine tool according to claim 1, wherein
   the threshold setting unit calculates absolute values of differences of the tool masses, between the respective tool holding parts, of a tool mass arrangement pattern stored in the tool mass arrangement storage unit and the tool mass arrangement patterns stored in the threshold storage unit, and selects a tool mass arrangement pattern with which a sum total of the absolute values becomes smallest, thereby setting a threshold.

3. A machine tool comprising:
   a rotating-type tool magazine that is capable of attaching/detaching a tool to/from a spindle of the machine tool;
   a plurality of tool holding parts that are radially provided at the tool magazine;
   a magazine driving motor that causes the tool magazine to rotate;
   a speed reducer that decelerates rotation of the magazine driving motor and transmits the decelerated rotation to the tool magazine; and
   a controller that has a function of estimating a disturbance estimation value on the speed reducer by an observer, based on a torque command and a speed feedback acquired when the magazine driving motor is rotated at a constant speed, and extracting a specific spectrum from a frequency component of the disturbance estimation value acquired by frequency analysis, and moreover comparing an amplitude of the specific spectrum with a threshold, thereby diagnosing abnormality of the speed reducer, wherein
   the controller includes:
   a threshold storage unit that changes tool mass arrangement patterns of the tool magazine to calculate load waveforms of the magazine driving motor acquired when the tool magazine is rotated at a prescribed speed pattern and stores the acquired load waveforms and thresholds associated with the load waveforms;
   a load waveform acquisition unit that rotates the tool magazine at the prescribed speed pattern to calculate a load waveform of the magazine driving motor; and
   a threshold setting unit that compares the load waveform acquired by the load waveform acquisition unit with the respective load waveforms stored in the threshold storage unit and sets a threshold, which is associated with a load waveform having a largest correlation coefficient and stored in the threshold storage unit, as a threshold to be used to diagnose abnormality of the speed reducer.

4. A machine tool comprising:
a rotating-type tool magazine that are capable of attaching/detaching a tool to/from a spindle of the machine tool;
a plurality of tool holding parts that is radially provided at the tool magazine;
a magazine driving motor that causes the tool magazine to rotate;
a speed reducer that decelerates rotation of the magazine driving motor and transmits the decelerated rotation to the tool magazine; and
a controller that has a function of estimating a disturbance estimation value on the speed reducer by an observer based on a torque command and a speed feedback acquired when the magazine driving motor is rotated at a constant speed, and extracting a specific spectrum from a frequency component of the disturbance estimation value acquired by frequency analysis, and moreover comparing an amplitude of the specific spectrum with a threshold, thereby diagnosing abnormality of the speed reducer, wherein
the controller includes:
a tool mass arrangement storage unit that stores masses of tools loaded onto the respective tool holding parts;
a reference tool mass arrangement storage unit that stores a reference tool mass arrangement pattern, based on which the masses of the tools loaded onto the respective tool holding parts are arranged;
a threshold storage unit that stores thresholds for respective deviation patterns between some tool mass arrangement patterns and the reference tool mass arrangement pattern,
a deviation pattern acquisition unit that calculates a deviation pattern between a tool mass arrangement stored in the tool mass arrangement storage unit and the reference tool mass arrangement pattern, and
a threshold setting unit that selects a deviation pattern similar to the deviation pattern acquired by the deviation pattern acquisition unit among the deviation patterns stored in the threshold storage unit and sets a threshold associated with the deviation pattern as a threshold to be used to diagnose abnormality of the speed reducer.

5. A machine tool comprising:
a rotating-type tool magazine that is capable of attaching/detaching a tool to/from a spindle of the machine tool;
a plurality of tool holding parts that are radially provided at the tool magazine;
a magazine driving motor that causes the tool magazine to rotate;
a speed reducer that decelerates rotation of the magazine driving motor and transmits the decelerated rotation to the tool magazine; and
a controller that has a function of estimating a disturbance estimation value on the speed reducer by an observer based on a torque command and a speed feedback acquired when the magazine driving motor is rotated at a constant speed, and extracting a specific spectrum from a frequency component of the disturbance estimation value acquired by frequency analysis, and moreover comparing an amplitude of the specific spectrum with a threshold, thereby diagnosing abnormality of the speed reducer, wherein
the controller includes:
a magazine total mass/centroid position storage unit that stores a total mass and a centroid position of the tool magazine;
a threshold storage unit that stores some total mass/centroid position patterns of the tool magazine and thresholds after associating the patterns with the thresholds; and
a threshold setting unit that selects a pattern similar to a total mass/centroid position pattern stored in the magazine total mass/centroid position storage unit among the total mass/centroid position patterns stored in the threshold storage unit and sets a threshold associated with the pattern as a threshold to be used to diagnose abnormality of the speed reducer.

6. The machine tool according to claim 1, wherein the controller is configured to inform, when the specific spectrum exceeds the threshold at diagnosis of the abnormality of the speed reducer, a fact that the specific spectrum exceeds the threshold, via a display device.

\* \* \* \* \*